Dec. 14, 1943.    H. A. WADMAN    2,336,821
METHOD OF FORMING LIGHT WEIGHT GLASS CONTAINERS
OF NOVEL DISTRIBUTION
Filed May 9, 1942
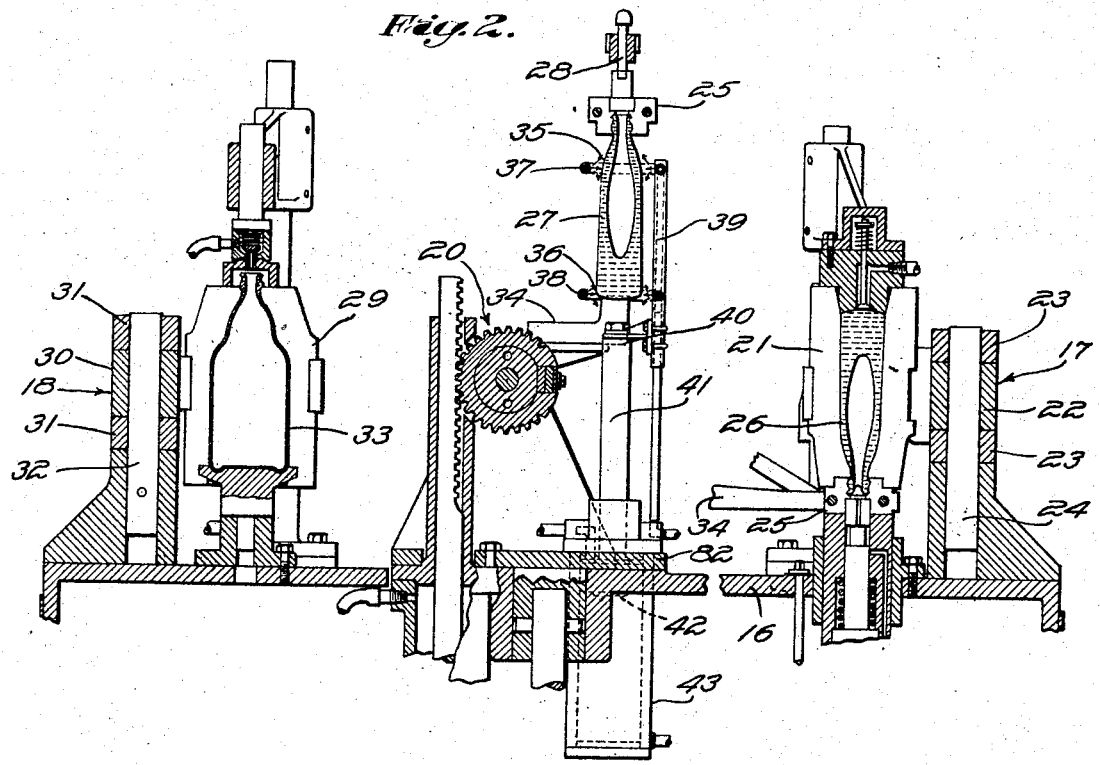
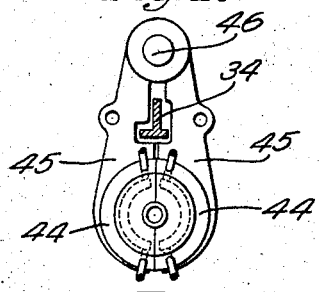
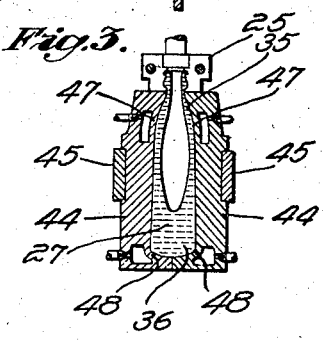
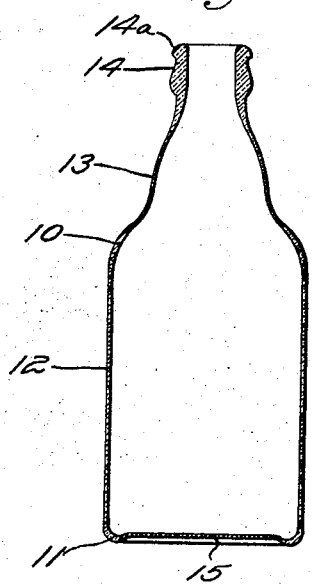
Inventor
Harold A. Wadman
by Brown & Parham
Attorneys
Witness
W. B. Thayer.

UNITED STATES PATENT OFFICE 2,336,821

METHOD OF FORMING LIGHTWEIGHT GLASS CONTAINERS OF NOVEL DISTRIBUTION

Harold A. Wadman, West Hartford, Conn., assignor to Hartford-Empire Company, Hartford, Conn., a corporation of Delaware Application May 9, 1942, Serial No. 442,302

4 Claims. (Cl. 49—80)

This invention relates to the manufacture of glass containers, such as bottles of various specifically different shapes and other hollow glass articles, especially those which have more or less abruptly outturned shoulders at the junctures of their neck and body portions.

Such glass containers, as produced prior to the present invention by commercial glass forming methods and apparatus, have certain characteristic physical shortcomings which this invention aims to cure. Among these is the relative thinness of the walls of such containers at their shoulders as compared with other portions of such walls. This shortcoming is the result of inability of the prior glass forming methods and apparatus to control distribution of the glass of a charge to the several portions of the walls of the container being formed of the charge adequately to prevent the formation of a relatively thin wall at the shoulder portion of such container.

Containers having relatively thin walls at their shoulder portions have the further shortcomings that they cannot be made as light in total weight as would be feasible if their shoulders were relatively thicker. Obviously, considerable excess glass is included in the thicker-walled portions of such an article because of the necessity of using a charge containing enough glass to provide sufficient thickness and strength at the relatively thin shoulder portions thereof to satisfy minimum requirements for such an article.

A further shortcoming of the shouldered glass containers of the prior art is that the substantial variations of wall thickness at different portions thereof, particularly the relative thinness of the shoulder portions, contribute materially to the difficulties in the way of successful tempering of such articles.

A shouldered container is particularly vulnerable at its shoulder portion because of the exposed position and substantial diameter of this portion. Such an article also is vulnerable at the angular or curved corner portion by which the side wall and bottom of the article are united. The novel shouldered container of the present invention has the requisite thickness at both these places.

The outer corner portion of the neck end or lip of a bottle or other glass container also is a place at which the container is likely to be struck should it accidentally be dropped or knocked from a support or hit by a moving object. This portion of the container usually has the thickness requisite for the strength desired and, in the case of articles having relatively narrow necks, is further aided in its resistance to shock or jar or the impact of a blow by the relatively small diameter thereof. The novel shouldered container of the present invention also has these desirable features of the neck end portion of the prior art containers.

An object of the present invention is to provide a relatively simple, practicable method of forming charges of molten glass into shouldered containers, such as shouldered bottles, which will have relatively thick walls at their exposed shoulder and bottom corner portions.

In carrying the present invention into effect, I may cause a relatively intensified local chilling of the portions of the walls of a partially expanded hollow glass body or parison which subsequently will become the shoulder and bottom corner portions of the container that will be formed by the blowing or expansion of that parison to the final size and shape desired. This may be done at a station intermediate that at which a charge is received and formed into the parison and that at which the parison is formed into a container of the final shape desired. The intensified local chilling of the portions of the parison above referred to will obviate undesirable thinning of the shoulder and bottom corner portions of the finally blown article.

Other objects and advantages of the invention will hereinafter be pointed out or will be obvious from the following description of the practical embodiments thereof which are shown in the accompanying drawing, in which:

Figure 1 is a vertical section of a bottle having novel physical features which characterize the invention;

Fig. 2 is a view, partly in elevation but mainly in vertical section, showing apparatus for forming the novel bottle of Fig. 1;

Fig. 3 is a vertical section of a modified form of means for effecting relatively intense or great local chilling of appropriate portions of a hollow parison which may be blown to form a similar bottle; and Fig. 4 is a plan view of the modified form of chilling means.

The illustrative container of the invention shown in Fig. 1 is a light weight steinie beer bottle. This bottle has been formed in accordance with the invention to be desirably heavy at its shoulder portion 10 and at its lower or bottom corner portion 11 while the side wall of the body 12 and the wall of the neck portion 13 are kept desirably thin and therefore relatively light in weight. The exposed shoulder and lower corner portion thus are formed to have the strength required at these places in a bottle of the kind shown without any extra or excess glass having been included in the more protected body side wall and neck portion of the bottle. In the example shown, the neck finish portion 14 has been kept desirably thick and heavy so that the bottle is relatively strong at this portion which includes the exposed upper corner portion 14a at the mouth or open end of the bottle. The bottom 15 of the bottle also is relatively thin, particularly at the central portion thereof, and thus further differs from blown bottles as customarily produced by prior methods and machines. The bottoms of such prior art bottles usually are relatively thick, particularly at their central portions.

Since, contrary to prior practice, the shoulder and lower corner portions of the novel bottle of my invention are made to be thicker or at least not substantially thinner than their less exposed neck and body side wall portions, it is entirely feasible to form my novel bottle of a given size and shape from a charge of substantially less size and weight than customarily has been used for the production of a bottle of the same size and general shape by prior methods and machinery. This is because the present invention provides better control of the distribution of the glass of a charge throughout the several portions of the wall of the article being made. Enough glass of a charge is distributed to the shoulder and to each of the other laterally exposed or projecting portions of the article to make such portions stronger than or at least as strong as the remaining less exposed portions of the article. For example, a steinie beer bottle of full size may be made according to the present invention of a charge weighing as little as three ounces. Charges weighing several times that amount customarily have been used for such a bottle.

The light weight steinie may be formed according to the invention to have a wall thickness of approximately .04" at its neck, about .06" at its shoulder, about .04" at its body, about .06 at the upper part and .08" at the lower part of its lower or bottom corner, and about .04" at the center of its bottom. The neck finish wall may be of standard thickness. Such a bottle will be sufficiently thick or heavy at every portion thereof to supply the requisite strength at that portion under any standard test applicable thereto. Such a bottle also is well adapted to be treated satisfactorily by a tempering process.

For performance of the novel method of my invention, I may make use of a glass container forming machine substantially as disclosed in my Patent No. 2,151,876, granted March 28, 1939, when such machine has been equipped with means for effecting the desired intensified or relatively great local chilling of the appropriate portion or portions of each hollow parison formed by the machine. I have shown in Fig. 2 such portions of the machine of my aforesaid patent as are believed to require illustration in conjunction with the parison chilling means of the present invention.

The apparatus shown in Fig. 2 includes a stationary supporting base or platform member 16. This supporting member carries a parison forming mechanism generally indicated at 17 for receiving a charge of molten glass and for forming it into an inverted counterblown hollow parison at a fixed parison forming station, a final blowing mechanism generally indicated at 18 for forming the finally blown article from an upright hollow parison delivered thereto at another horizontally spaced fixed station, and a transfer mechanism generally indicated at 20 for transferring the hollow parison from the parison forming mechanism to the final blowing mechanism, meanwhile reverting such parison.

The parison forming mechanism 17 includes an inverted parison mold 21 made in cooperative halves carried by holders having pivoted portions 22 and 23 mounted on a vertical pivot shaft 24. In the machine of my aforesaid Patent 2,151,876, two similar neck rings 25 are provided, each being made in cooperative halves. One of the neck rings 25 is shown in the right hand portion of Fig. 2 in inverted position beneath the inverted parison mold 21. In this position, the neck ring serves as a part of the parison forming mechanism 17 and cooperates with the other parts of such mechanism to form a charge of glass (not shown) into an inverted hollow parison such as that indicated at 26. This operation need not be further described as it may be done by the steps and sequence of steps usually employed to form such a charge into an inverted counterblown parison.

The second neck ring 25 is shown upright at an intermediate station between the parison forming and final blowing station. At this intermediate station, the second neck ring 25 supports in an upright pendant position a hollow parison 27 which was produced by the immediately preceding parison-forming operation of the mechanism 17 and may be similar to the parison 26. This intermediate station is that at which the suspended parison is permitted to reheat in the cycle of article forming operations of the machine of my Patent 2,151,876. Puff blowing of the suspended parison also may be accomplished at that station, as by air from a nozzle 28.

After the desired period of dwell at the intermediate station, the suspended parison may be moved by its supporting neck ring to the final blowing station where it may be enclosed within a final blow mold 29. The latter may be made in cooperative halves respectively carried by holders having portions 30 and 31 pivotally mounted on a vertical pivot shaft 32. When the parison has been enclosed within the final blow mold, the neck ring by which such parison was brought to the final blowing station may be opened to release the parison. Such neck ring then may be returned to the position shown for the first neck ring, i. e., in inverted position beneath the parison mold 21, the neck ring previously occupying that position having in the meantime been moved to the intermediate parison reheat station where it now supports an upright suspended hollow parison. During the same cycle, the parison in the final blow mold is blown therein to form an article of the final shape desired, indicated at 33 as a bottle.

The operations as just described are those which may be performed by the forming machine of my aforesaid Patent 2,151,876. The details of this machine, per se, do not form part of the present invention. Reference may be had to Patent No. 2,151,876 for a further understanding of such details if desired. It is believed to be sufficient in this specification to note that the transfer mechanism comprises means, including arms 34, for supporting and operating the neck rings so that each is moved in its turn from an inverted position at the parison forming station to a reverted position at the intermediate parison reheat station, then to the final blowing station, and finally back to an inverted position at the parison forming station, the halves of the neck ring being opened and closed at the proper times in the cycle of movements of such neck ring. It is to be understood that any other suitable parison transferring mechanism may be employed in the performance of the present invention. Indeed, as hereinafter will become apparent, manually operated tools might be employed to support and move each hollow parison as required in the performance of the method of the invention although the use of an automatic transfer mechanism would of course be preferred for practical commercial reasons.

Local chilling of each hollow parison may be effected when the parison is at the intermediate reheat station as shown in the middle portion of Fig. 2. To this end, air or any other suitable glass chilling fluid may be blown against the outer peripheral surfaces of the portions of the parison which will form the shouldered and lower or bottom corner portions of the finally formed article. These portions of the parison 27 are indicated at 35 and 36, respectively, in Fig. 2. The blowing means shown comprises an upper ring nozzle 37 and a lower ring nozzle 38. These are connected and maintained in appropriate vertically spaced aligned relation by a vertical chilling fluid supply pipe 39. This pipe is carried by a bracket 40 on the upper end of an upwardly projecting rod 41 of a piston 42 which is reciprocable in a vertical cylinder 43. The latter may be supported on a member 82 which in the machine of my aforesaid Patent 2,151,876 rests upon the machine base or platform member 16 so that it may be oscillated thereon during the operation of the particular transfer mechanism of that machine.

When the parison is brought to the intermediate reheat station, as shown for the parison 27 in Fig. 2, the piston 42 will be at the lower end of its stroke so that the blowing frame ring nozzles will be similarly retracted. Upward movement of the piston 42 in its cylinder will raise the nozzles 37 and 38 to the positions shown. The chilling fluid then may be supplied to these nozzles through the pipe 39 and any suitably connected timed fluid supply means (not shown). After a predetermined period of external fluid chilling of the portions 35 and 36 of the parison, the chilling fluid may be cut off and the blowing frame retracted downwardly by downward movement of the piston 42. The parison then may be moved to the final blowing station where it will be blown in the blow mold 29 to form the bottle 33.

The ring nozzles 37 and 38 may be suitably formed and apertured to apply cooling fluid uniformly around the portions 35 and 36 of the hollow parison to be treated in accordance with the present invention or they may be rotatively oscillated or vertically reciprocated by obvious means, to diffuse the local cooling effect from the individual nozzle openings. The chilling fluid discharge means may be constructed and arranged to chill locally the shoulder portion and/or the bottom corner portion or any desired other part or parts of the parison.

The local chilling of a part or parts of the parison may be effected by the contact therewith of a suitable heat abstracting metallic or other solid means. Such means, as shown in Figs. 3 and 4, comprises a pair of cooperative chilling mold halves 44 carried by holders which may be mounted pivotally on a vertical shaft 46 (Fig. 4). The arrangement may be such that when the parison 27 is at the position shown in Fig. 2 or at any other suitable position, the previously open halves 44 of the chilling mold are closed to embrace the parison as shown in Fig. 3. At this time, water cooled portions 47 and 48 of the chilling mold will be in contact with and will locally chill the portions 35 and 36 of the parison. The chilling mold may have the portions thereof which are to effect the local chilling formed of more highly conductive metal than that of which the remainder of the mold walls is composed. Chilling contact strips may be applied to the portions of the parison to be locally chilled while the remainder of the parison may be left bare or unenclosed.

The local chilling of the desired portion or portions of the hollow parison may be effected at various times in a cycle of operations for forming a charge into a hollow glass article and in various ways which will readily occur to those skilled in the art.

I claim:

1. The method of forming a light weight glass bottle or other glass container which comprises forming a charge of glass into a hollow parison suitable for further expansion to the contour and size desired for the container, applying a chilling influence to a predetermined portion only of the parison to intensify the cooling of that portion as compared with the cooling of the adjacent portions of the parison, and then blowing said parison to form the container desired.

2. The method of forming a light weight bottle having a relatively heavy shoulder portion which comprises forming a charge of molten glass into a hollow parison of a size and shape suitable for further expansion of the parison to the size and shape of the bottle desired, locally chilling the portion of the parison that will form the shoulder portion of the bottle, and then expanding said parison to form said bottle.

3. The method of forming a light weight bottle having relatively heavy shoulder and bottom corner portions which comprises forming a charge of molten glass into a hollow parison suitable to be expanded further by blowing in a mold to the shape and size of the bottle desired, locally chilling the portions of said parison which will become the shoulder and bottom corner portions of the bottle, and thereafter blowing said parison in said mold to form said bottle.

4. The method of forming a light weight bottle having a relatively heavy bottom corner portion which comprises forming a charge of molten glass into a hollow parison of a size and shape suitable for further expansion of the parison to the size and shape of the bottle desired, locally chilling the portion of the parison that will form the bottom corner portion of the bottle, and then expanding said parison to form said bottle.

HAROLD A. WADMAN.